March 24, 1970   J. B. DAY   3,502,842
HEATER FOR AEROSOL FOAM DISPENSING CONTAINERS
Filed Feb. 13, 1968
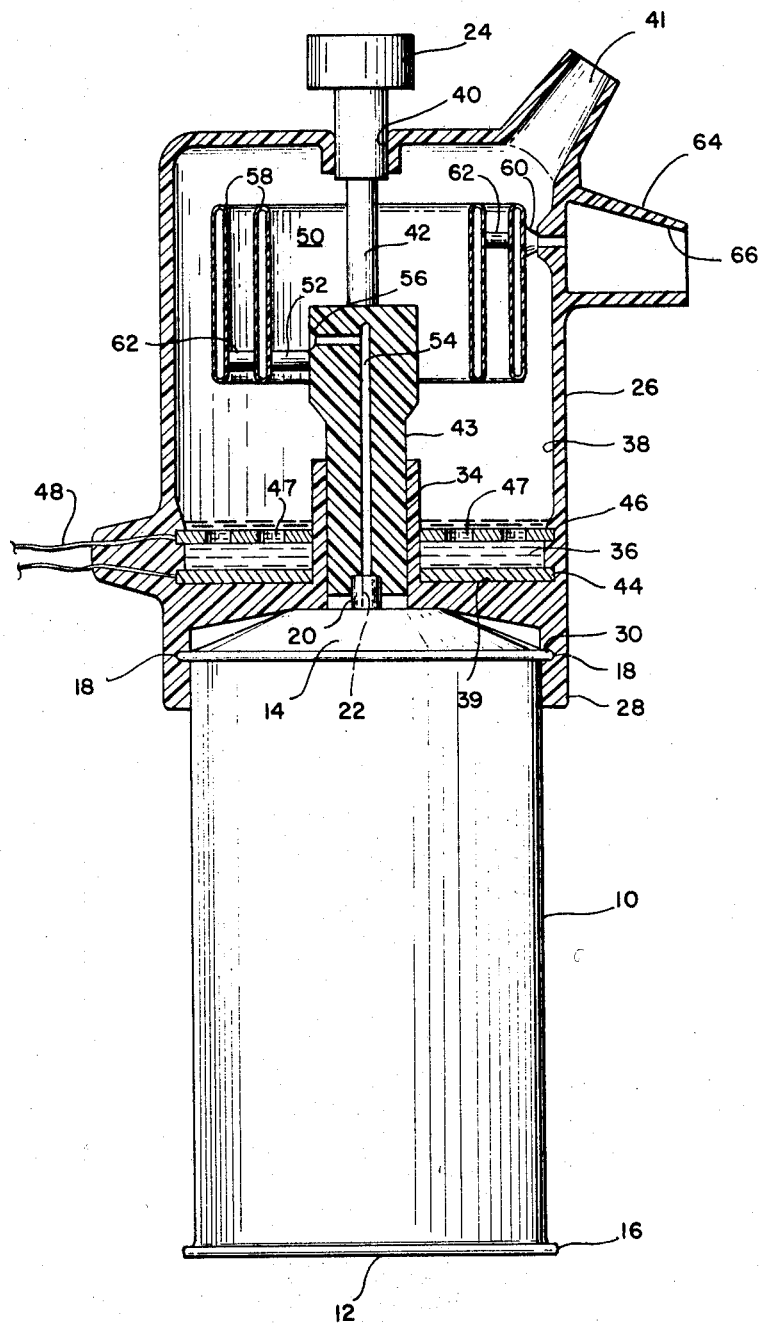
INVENTOR
JOHN B. DAY

United States Patent Office 3,502,842
Patented Mar. 24, 1970

3,502,842
HEATER FOR AEROSOL FOAM DISPENSING CONTAINERS
John B. Day, Columbus, Ohio, assignor to Carter-Wallace, Inc., New York, N.Y., a corporation of Maryland
Filed Feb. 13, 1968, Ser. No. 705,171
Int. Cl. B67d *5/62;* F24h *1/20;* H05b *3/60*
U.S. Cl. 219—302              4 Claims

ABSTRACT OF THE DISCLOSURE

A device is provided for heating foam products as they are discharged from aerosol containers. The device rapidly heats foam products, such as foam shaving lather, by passing the foam in heat transfer relationship with a supply of steam. The device includes a reservoir for holding a supply of water and a pair of spaced electrical conductors carrying an electrical potential that are in contact with the water. The resistance of the water to the flow of electrical energy through it heats the water and produces the steam which is used to raise the temperature of the foam substantially above room temperature as the foam is discharged from the container.

---

This invention relates to a heating device for aerosol containers, and more particularly to a heating device that can be interconnected with the discharge opening of an aerosol container for rapidly heating foam products, such as foam shaving lather and the like, as they are discharged from the container.

Conventional aerosol containers use a propellant gas to discharge foam products from their containers. Generally, the propellant gas is dispersed throughout the product under pressure and in liquefied form. Upon release of the discharge outlet of the container, the propellant forces the product out of the container and, simultaneously, expands to form gas bubbles and generate the foam.

Expansion of the propellant from a liquid to a gas, however, has a cooling effect on the foam product. This cooling effect is particularly undesirable in shaving lathers, because cold shaving lather foams are not only uncomfortable but are also slow in softening the beard for the shaving operation. Human hair is more easily shaved after it has been softened by the penetration of moisture from the lather, and this softening effect increases with increasing lather temperature.

For this reason numerous heating devices have been proposed for heating foam shaving lathers as they are discharged from their containers.

Foam shaving lather is difficult to heat, however, since the gas bubbles in the lather act as heat insulators. Further, the foams have a high viscosity, and although it is desirable to constrict the passage of foam so that heat can be rapidly transferred to it, such constricted flow prevents the heated foam from being supplied to the user at a useful rate.

Some of the proposed devices for heating foam shaving lather use electrical heating elements to heat a conduit or tube through which the foam passes. Other devices provide a reservoir for hot tap water that jackets the tube to heat the lather as it passes through the device.

These devices, however, have generally not proven entirely satisfactory in heating foam shaving lather to the desired temperature within a convenient length of time. Electrical heating elements, for example, require considerable "warm up" time between the time the heating element is actuated and the time the device becomes hot enough to heat the foam. Further, in most of these devices the passageway for the foam must be constricted considerably below a useful flow rate, so that sufficient amounts of heat can be transferred to the foam.

Similarly, hot water heaters do not heat the foam substantially above room temperature or close to the temperature of the hot tap water unless the heating period is prolonged for an inconvenient length of time.

Thus, hot foam temperatures cannot be obtained from such devices unless the flow rate of the foam is reduced substantially so that the residence time in the device is long enough to allow sufficient transfer of heat to the foam. At this reduced flow rate, however, the time necessary to accumulate sufficient amounts of lather results in a cooling or coarsening of the foam.

For these reasons, it is desirable to provide a new and improved heating device for aerosol containers that requires a very short preheating time, that rapidly heats the foam as it is discharged from the container, and that delivers the required amount of hot foam to the user at a desirable flow rate.

Accordingly, it is a primary object of this invention to provide a new and improved heating device for heating foam products as they are discharged from aerosol containers.

Another object of this invention is to provide a new and improved heating device that rapidly heats foam shaving lather as it is discharged from an aerosol container to a temperature substantially above room temperature and that supplies heated foam lather at a desirable flow rate.

Still another object of this invention is to provide a heating device that uses steam to rapidly heat foam shaving lather as it is discharged from an aerosol container.

A further object of this invention is to provide a steam heating device for rapidly heating foam shaving lather that avoids danger of overheating the foam and that automatically turns itself off after the prescribed heating period.

A still further object of one embodiment of this invention is to provide a steam heating device for rapidly heating foam shaving lather that uses the electrical resistance of water to generate steam which is used to heat the foam.

Yet a further object of this invention is to provide an improved electrical heating device for heating foam having lather that can be detachably interconnected with the discharge opening of an aerosol container, that is adaptable to all sizes of aerosol containers, that is rugged, that is simple in construction, and that is convenient in use.

Additional objects and advantages of this invention will be set forth in part in the description which follows and in part will be obvious from the description or may be learned by practice of the invention, the objects and advantages being realized and attained by means of the instrumentalities, devices, and combinations particularly pointed out in the appended claims.

To achieve the foregoing objects and in accordance with its purpose, this invention, as embodied and broadly described comprises a heating device for heating foam as it is discharged from the outlet of a valve-actuated aerosol container. The heating device includes a housing having a reservoir for holding a supply of water; electrical heating means located within the housing for heating the water to generate steam; housing inlet means communicating with the outlet of the container for conducting foam discharged from the container into the housing; heat exchanging means mounted within the housing for confining the flow of foam through the housing in heat transfer relationship with the steam; and housing outlet means for discharging heated foam from the housing.

The accompanying drawing which is incorporated in and constitutes a part of this specification, illustrates an embodiment of the invention and, together with the description, serves to explain the principles of this invention.

The drawing is a sectional elevation of the heating device of this invention mounted to the top of an aerosol container.

It is to be understood that both the foregoing general description and the following detailed description are exemplary and explanatory but are not restrictive of the invention.

Reference will now be made in detail to the present preferred embodiment of the invention, an example of which is illustrated in the accompanying drawing.

The present invention provides an electrical heating device for aerosol containers that produces steam from a supply of water maintained in the heating device to rapidly heat foam shaving lather as it is discharged from the container.

A typical aerosol container 10 is shown in the drawing. Container 10 has a bottom 12 and a lid 14, each provided with a peripheral curl 16 or 18, respectively, to secure them to the container. Lid 14 has a central opening in its top for discharge of the foam product from the container. The product is maintained within container 10 under the pressure of a propellent gas allowing for discharge of the product through the central opening in the top of the container.

Aerosol container 10 includes a valve actuator 20 having an outlet passage 22. When valve actuator 20 is depressed by actuation of a valve button 24, foam is expelled from the container in a controlled manner. A typical valve construction is described in U.S. Patent 3,171,572 to Reich et al., and reference is made to that patent for a more detailed discussion of the construction and operation of this valve. While the valve construction illustrated in Patent 3,171,572 is suitable for use with the heating device of this invention, it will be understood, of course, that other and different forms of valve mechanisms may also be employed with the present invention.

An embodiment of the heating device of the present invention and its removable attachment to the top of an aerosol container is shown in the drawing. The heating device includes a housing 26 made of plastic. Housing 26 preferably has good stiffness and lightness and good thermal and electrical insulation properties. Suitable plastic materials for construction of the housing include linear polyethylene, polypropylene, polystyrene or other similar materials.

As shown in the drawing, the bottom of housing 26 is provided with a peripheral annular flange 28, having an internal annular groove 30 that grips peripheral curls 18 of lid 14 for snap attachment of the heating device to aerosol container 10. Housing 26 is cylindrical and has outer side walls that extend upwardly and inwardly across the top, forming a hollow enclosure.

An inner cylindrical wall 34 is provided in the lower portion of housing 26 that forms an annular reservoir 36 with the inner side wall surface 38 and bottom 39 of housing 26 to hold a supply of water. An aperture 40 and a spout 41 are provided in the top of housing 26.

Valve button 24 extends through aperture 40 and includes a valve stem 42 and a valve plunger 43. Plunger 43 extends through inner cylindrical wall 34 and engages valve actuator 20 to permit actuation of the container's outlet valve (not shown) when the heating device is attached to the container. Spout 41 permits the user of the device to add the required amount of water to the device, for the purpose more fully described below.

In accordance with the invention, electrical heating means are provided for heating the supply of water in reservoir 36 to generate steam for use in heating the foam as it is discharged from the container. As embodied, and as shown in the drawing, this heating means comprises a pair of spaced annular metal plates 44 and 46 that are mounted in reservoir 36 in the bottom of housing 26. Plates 44 and 46 are constructed of electrically-conductive material, such as copper, aluminum, stainless steel or the like, and are electrically insulated from each other by electrically-nonconductive housing 26. The plates are electrically connected to opposite terminals of a conventional (110 volt AC) household circuit through electrical cord 48.

Plate 46 includes a plurality of apertures 47 that permit water, which has been added through spout 41, to flow down into reservoir 36 between plates 44 and 46. The metal plates are spaced relatively close depending upon the surface area of the plates and the amount of power output desired. Metal plates having a surface area of approximately two (2) square inches, for example, are spaced about one-eighth (⅛) inch apart to achieve maximum current flow between the plates and a rapid heating of the water in reservoir 36.

In operating the heating means of this invention, water, usually about 10 cc., is added through spout 41 until plates 44 and 46 are immersed within the reservoir of water 36 in the bottom of housing 26. The user then plugs cord 48 into an electrical outlet which supplies electrical energy to plates 44 and 46. Since electrically conductive plates 44 and 46 are electrically insulated from each other, the electrical circuit between the plates is completed by the water which has been added to the device.

The electrical resistance of the water to the flow of current through it causes the water to heat up very rapidly and to be vaporized to steam. This steam passes upwardly through apertures 47 in plate 46 to heat the foam as it passes through the heating device of this invention. Uncondensed steam is vented through spout 41.

In accordance with the invention, heat exchanging means are provided within housing 26 for confining the flow of foam through the housing in heat transfer relationship with the steam. As embodied, and as shown in the drawing, this means comprises a radiator 50, mounted within housing 26 and exposed to the steam passing upwardly through the housing. Radiator 50 is provided with an inlet passage 52 that communicates with a passageway 54 in valve plunger 43. Passageway 54 also communicates with outlet 22 of valve actuator 20 and includes an outlet 56 that flares outwardly and is aligned with radiator inlet passage 52 when valve button 24 is depressed by the user of the device.

Radiator 50 includes a plurality of annular hollow chambers 58 that are interconnected by passageways 62 and communicate with inlet passage 52 and radiator outlet passage 60 in the wall of housing 26. A discharge spout 64 extends outward from the exterior surface of housing 26 and contains an internal conduit 66 that communicates with outlet passage 60.

Radiator 50 is preferably constructed of a plurality of pairs of thin, cylindrical metal plates that are sealed along their top and bottom edges to provide hollow chambers 58 for confining the flow of foam through the radiator to a thin, wide sheet. In a preferred form of the invention, the spacing between the parallel walls of chambers 58 is about 0.015 inch.

It is to be understood from the above description that other types of heat exchangers can also be suitably used in accordance with this invention to form and confine the flow of foam through the housing to a thin, wide sheet. For example, any number of interconnected hollow annular chambers 58 having common inlet and outlet passageways can be substituted for the two annular chambers shown in the drawing.

In operation of the heating device of this invention, as embodied in the accompanying drawing, the user adds the required amount of water (normally about 10 cc.) to the device through spout 41 and plugs cord 48 into an electrical outlet. Electrical energy then flows to plates 44 and 46 and through the water in reservoir 36. The electrical resistance of the water to the flow of electrical energy generates heat, which raises the temperature of the water to boiling, and produces steam which passes upwardly through apertures 47 in plate 46 and out of the device through spout 41.

The steam is produced very rapidly, and as soon as the user observes steam emerging from spout 41, he can depress valve button 24 to actuate valve actuator 20 and discharge foam from the container. The propellant within aerosol container 10 propels the product out of the container through outlet 22 in valve actuator 20, through passage 54 in valve plunger 43 and into inlet passage 52 of radiator 50. As the foam enters the radiator, it is formed into a thin, wide sheet by the confining walls of chambers 58. Under the continued pressure of the container, the foam product proceeds through chambers 58 toward outlet passage 60 where it emerges from the device through spout 64.

As the foam passes through chambers 58, rapid heat transfer occurs through intimate contact of the foam with the hot walls of the chambers, which have been heated by the steam flowing over the outer surfaces of radiator 50. Because the foam is confined to a thin, wide sheet during its passage through chambers 58, the formation of multiple layers of bubbles, which would otherwise act as heat insulators, is reduced and a high rate of heat transfer between the steam and the foam occurs, rapidly heating the foam to a temperature substantially above room temperature—preferably to a temperature of from about 130 to 160° F.

Since electrical current can only flow between plates 44 and 46 when water is present in reservoir 36, no electrical switch or other control means is required to control the flow of current to the heating device of this invention. As soon as the level of water in reservoir 36 has fallen below upper plate 46, the flow of electrical energy between the plates is interrupted and, therefore, the device automatically turns itself off when the supply of water is depleted.

Further, by using steam to heat the foam, rather than an electrical resistance heater, the device will rapidly reach the required operating temperature and will remain at that temperature, i.e., at the boiling point of water. The device, therefore, is self-regulating and overheating of either the foam or the device is avoided.

For safety reasons, an electrical switch may be provided, if desired, to further control the flow of current to the heating device of this invention. For example, a manually operated switch can be mounted to electrical cord 48 or directly to the heating device, as will be readily apparent to those skilled in the art.

The present invention thus provides a heating device for rapidly heating foam shaving lather as it is discharged from an aerosol container. The device uses the electrical resistance of a supply of water to generate steam, which is passed in heat transfer relationship with the foam to rapidly heat the foam as it is discharged from the container. By increasing the temperature of the foam lather, and thereby increasing its solubility in water, better contact with the beard and increased comfort for the shaver is afforded.

While a separate heating device for removable attachment to an aerosol container has been illustrated in the drawing, it will be understood from the above description that the heating device of this invention may also be made a permanent or integral part of the container.

The invention in its broader aspects is not limited to the specific details shown and described, but departures may be made from such details within the spirit and scope of the accompanying claims without departing from the principles of the invention and without sacrificing its chief advantages.

What is claimed is:
1. A heating device for heating foam as it is discharged from the outlet of a valve-actuated aerosol container, which comprises:
(a) a housing defining a cavity wherein the bottom of said cavity contains a reservoir, said reservoir utilized to hold a supply of a liquid;
(b) electrical heating means contained within said reservoir for heating said liquid so as to generate a vapor wherein said heating means comprises:
(i) a first electrode affixed to the bottom of said reservoir
(ii) a second electrode affixed to said housing and positioned in a spaced relationship directly above said first electrode
(iii) electrical coupling means for electrically coupling said first and second electrodes to a source of electrical energy, a completed electrical circuit occurring when said liquid immerses both of said electrodes;
(c) heat exchanging means having an inlet opening and an outlet opening, said means mounted within said housing and above said reservoir so as to be heated by the vapor generated from said reservoir, wherein said heat exchanging means comprises a series of interconnected flat narrow passageways contained between said inlet and outlet openings through which said foam is conducted;
(d) housing inlet means communicating with the outlet of said container for conducting foam discharged from said container to said inlet opening of said heat exchanging means;
(e) housing outlet means for discharging heated foam from said outlet opening of siad heat exchanging to the exterior of said housing.

2. A heating device as described in claim 1 wherein said second electrode contains apertures.

3. A heating device as described in claim 1 wherein said first and second electrodes are constructed of stainless steel.

4. A heating device as described in claim 1 wherein the heat exchanging means comprises a radiator of heat-conductive metallic construction, said radiator confining the flow of said foam through the radiator to a sheet of foam whose surfaces are in a heat transfer relationship with said vapor.

References Cited

UNITED STATES PATENTS

| 1,693,182 | 11/1928 | Rochester | 219—285 X |
| 1,848,028 | 3/1932 | Ritchie | 219—293 |
| 1,987,119 | 1/1935 | Long | 219—325 |
| 2,087,586 | 7/1937 | Tishman | 219—326 |
| 2,106,011 | 1/1938 | Roberson | 219—289 |
| 2,402,899 | 6/1946 | Knapp | 219—326 X |
| 2,987,605 | 6/1961 | Brandl | 219—303 X |
| 3,175,733 | 3/1965 | Lerner | 222—146 |
| 3,184,114 | 5/1965 | Minear | 222—146 |
| 3,222,499 | 12/1965 | Conlin et al. | 219—293 X |
| 3,241,723 | 3/1966 | Lerner | 222—146 |

FOREIGN PATENTS 723,059   7/1942   Germany.

ANTHONY BARTIS, Primary Examiner

U.S. Cl. X.R.

222—146; 219—293, 326, 214; 239—135